US006813493B2

United States Patent
Criqui et al.

(10) Patent No.: US 6,813,493 B2
(45) Date of Patent: Nov. 2, 2004

(54) CELLULAR MOBILE TELEPHONE SYSTEM THAT CAN BE USED ON BOARD A VEHICLE

(75) Inventors: Jean-François Criqui, Asnieres (FR); Francis Argouarch, Brest (FR); Gérard Auvray, Bezons (FR)

(73) Assignee: Alcatel, Paris (FR)

( * ) Notice: Subject to any disclaimer, the term of this patent is extended or adjusted under 35 U.S.C. 154(b) by 528 days.

(21) Appl. No.: 10/046,899

(22) Filed: Jan. 17, 2002

(65) Prior Publication Data

US 2002/0123344 A1 Sep. 5, 2002

(30) Foreign Application Priority Data

Mar. 1, 2001 (FR) .......................................... 01 02805

(51) Int. Cl.[7] ................................................ H04Q 7/20
(52) U.S. Cl. ........................ 455/431; 455/98; 455/99
(58) Field of Search .............................. 455/431, 575.9, 455/99, 98, 152.1, 345, 346, 422.1, 426.2, 554.7

(56) References Cited

U.S. PATENT DOCUMENTS 6,055,425 A * 4/2000 Sinivaara .................... 455/431

6,603,967 B1 * 8/2003 Sinivaara et al. ........... 455/431
2002/0090946 A1 * 7/2002 Mielke et al ................ 455/435

FOREIGN PATENT DOCUMENTS

| EP | 0 998 062 A | 5/2000 |
| WO | WO 00/57578 | 9/2000 |

* cited by examiner

Primary Examiner—Lester G. Kincaid
Assistant Examiner—James K Moore
(74) Attorney, Agent, or Firm—Sughrue Mion, PLLC

(57) ABSTRACT

A cellular mobile telephone system which can be used on board a vehicle enables conventional mobile telephones to be used on board an aircraft, for example. It includes a first transceiver on board the vehicle and connected to an antenna on the outside of the aircraft to set up an external radio link with a terrestrial mobile telephone network via a satellite. It further includes a second transceiver having an antenna inside the aircraft and connected to a base station controller. The second station and the base station controller have functions similar to those of a base station system in a conventional mobile telephone network, for example a GSM network. The base station controller is connected to the first transceiver. To prevent long signaling link set-up times, the base station controller includes software for setting up a signaling link between the aircraft and the terrestrial mobile telephone network in advance, as soon as at least one mobile telephone is switched on.

2 Claims, 1 Drawing Sheet

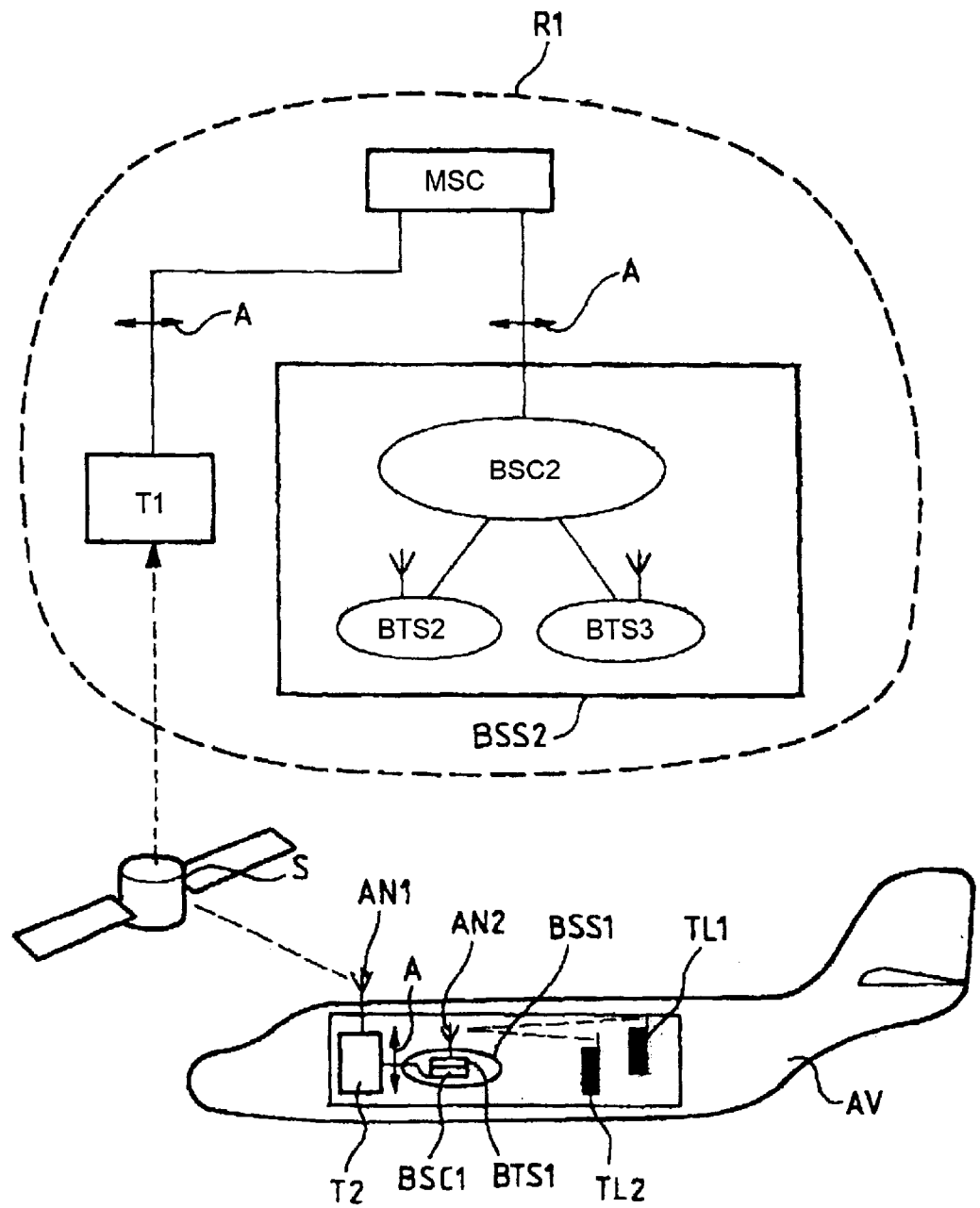

CELLULAR MOBILE TELEPHONE SYSTEM THAT CAN BE USED ON BOARD A VEHICLE

CROSS-REFERENCE TO RELATED APPLICATIONS

This application is based on French Patent Application No. 01 02 805 filed Mar. 1, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to a cellular mobile telephone system that can be used on board a vehicle, such as an aircraft, a train, a ship, etc., and which uses a satellite link.

2. Description of the Prior Art

The document WO 94/28684 describes a cellular mobile telephone system that can be used on board an aircraft. It enables conventional GSM mobile telephones to be used by connecting them to GSM base transceiver stations on board the aircraft by means of cables or infrared links, in order to prevent all risk of radio waves emitted by the mobile telephones interfering with navigation equipment. The base transceiver stations are connected to a base station controller which is also on board the aircraft and connected to an onboard switch. The onboard controller is connected to a terrestrial mobile telephone network by a direct radio link or via a satellite.

The document WO 98/21838 describes a system which is similar except that it includes a base station controller and a switch that are on the ground instead of on board the aircraft. An onboard base transceiver station is connected to the base station controller by a satellite link.

The document EP 0.998.062 describes a cellular mobile telephone system that can be used on board an aircraft. It enables conventional GSM mobile telephones to be used in the conventional way, i.e. with no cable or infrared link to connect them to onboard GSM base transceiver stations. The base transceiver stations are connected to an onboard controller which is connected to a terrestrial mobile telephone network by a satellite link.

The above prior art systems apply the standard GSM procedures. A signaling link must be set up first for an onboard mobile telephone to be able to perform an operation to enable the network to determine its location or to set up a call or for the terrestrial mobile network to set up a call to the aircraft. The GSM procedure for setting up a signaling link involves exchanging various signals. If a terrestrial digital telephone network executes the procedure, the time-delay on setting up the signaling link is imperceptible for users. If the signals are exchanged via a satellite system, the time-delay is several seconds (up to 20 seconds). This is a problem for users (who hang up because they believe the call has been lost) and for the telecommunication system itself (safety time-outs expire before the link is set up, aborting link set-up attempts).

The object of the invention is to propose a system that does not have this drawback of the prior art systems.

SUMMARY OF THE INVENTION

The invention consists in a cellular mobile telephone system that can be used on board an aircraft, the system including:

a first transceiver on board the vehicle and connected to an antenna outside the vehicle to set up an external radio link between the vehicle and a terrestrial mobile telephone network via a satellite; and means in the vehicle for coupling mobile telephones inside the vehicle to the transceiver, which coupling means include means for setting up a permanent signaling link between the vehicle and the terrestrial mobile telephone network as soon as at least one mobile telephone is switched on.

The above system anticipates the requirement for a signaling link in that a permanent signaling link is set up as soon as a first mobile telephone is switched on and executes the procedure for determining its location. There is therefore never any delay caused by setting up a signaling link, with the possible exception of the first call set-up request, if the latter immediately follows switching on the first mobile telephone.

In the event of a small number of simultaneous call set-up requests, the requesting mobile telephones use the same signaling link successively, with no perceptible waiting time. If the number of simultaneous requests exceeds a predetermined number, a second signaling link is set in advance.

The invention will be better understood and other features will become apparent on reading the following description which is given with reference to the single figure of the accompanying drawing.

BRIEF DESCRIPTION OF THE DRAWING

The single FIGURE of the accompanying drawing shows one embodiment of a system in accordance with the invention.

DETAILED DESCRIPTION OF THE PREFERRED EMBODIMENT

The system in accordance with the invention is used for GSM mobile telephones on board an aircraft AV. This preferred embodiment of the system includes:

a base station system BSS1 on board the aircraft AV and similar to a GSM radio subsystem as routinely used in a terrestrial GSM network;

an antenna AN2 inside the cabin of the aircraft and connected to the base station system BSS1 to enable it to communicate with GSM mobile telephones TL1, TL2, etc., used by passengers;

a transceiver T2 on board the aircraft, capable of communicating with a satellite and connected to an input-output port of the base station system BSS1; and an antenna AN1 outside the aircraft AV and connected to the transceiver T2.

The antenna AN1 provides a bidirectional radio link with a GSM terrestrial cellular mobile telephone network R1 via a satellite S and a ground station T1. The network R1 includes a plurality of base station systems, one of which is the base station system BSS2 shown in the figure by way of example. The base station system BSS2 includes a base station controller BSC2, for example, which is connected:

on the one hand, to a mobile service switching center MSC, via a GSM A interface; and on the other hand, to two GSM base transceiver stations BTS2 and BTS3.

The onboard base station system BSS1 is similar to a conventional GSM base station system such as the base station system BSS2. It is simplified because it requires less transmit power and a smaller capacity in terms of the number of mobile telephones served. It therefore includes a base station controller BSC1 and one or more base transceiver stations BTS1, the latter being connected to the antenna AN2. The base station controller BSC1 is connected to the transceiver T2 via an A interface.

The base station system BSS1 includes conventional circuits enabling mobile telephones TL1, TL2, etc. inside the aircraft AV to send and receive data. The base station controller BSC1 includes software for sending the transceiver T2 a series of commands for setting up a data transmission link to be used for signaling conforming to the GSM standard. These commands are defined in the GSM standard.

The transceiver T2 is a standard unit available off the shelf. It executes the series of commands, the effect of which is to set up a data transmission link able to transmit GSM signaling.

The base station controller BSC1 sets up the signaling link when the base station system BSS1 is switched on, in order for the base station system to log onto the mobile telephone network R1. When this procedure has been completed the link is cleared down. It is set up again when a first mobile telephone on board the aircraft is switched on and performs the procedure enabling its location to be determined. It remains set up for as long as at least one mobile terminal remains switched on, even if no call is set up to transmit voice signals or data other than signaling. Thus the mobile telephones can send signaling at any time, with no signaling link set-up time-delay.

The base station controller BSC1 counts the number of mobile telephones that are switched on. If a passenger switches off his mobile telephone, it sends the network a log off signal. The base station controller BSC1 detects that signal and reduces by one the number of mobile telephones that are switched on. If there are no longer any mobile telephones switched on, the base station controller BSC1 clears down the signaling link.

The transceiver T2, the antenna AN2 and the ground station T1 can be similar to those currently used for the telephone service on board aircraft or other vehicles. Depending on the traffic envisaged, the link between the aircraft AV and the network R1 can be a synchronous digital link (with a bit rate that is a multiple or a sub-multiple of 2 Mbit/s) or a packet mode transmission link. The ground station T1 is connected to the switching center MSC via an A interface. In one embodiment, the A interface can be implemented on a link employing the Internet Protocol.

The scope of the invention is not limited to the GSM standard, since all other types of mobile telephone system using a satellite have the same problem of signaling link set-up time-delay and can use a system similar to that described above.

There is claimed:

1. A cellular mobile telephone system that can be used on board a vehicle, said system including:
   a first transceiver on board said vehicle and connected to an antenna outside said vehicle to set up an external radio link between said vehicle and a terrestrial mobile telephone network via a satellite; and
   means in said vehicle for coupling mobile telephones inside said vehicle to said transceiver, which coupling means include means for setting up a permanent signaling link between said vehicle and said terrestrial mobile telephone network in response to detecting that at least one mobile telephone is switched on.

2. The system claimed in claim 1 wherein said coupling means include means for clearing down said signaling link between said vehicle and said terrestrial mobile telephone network if there are no longer any mobile telephones switched on.

* * * * *